US007769384B2

(12) United States Patent
Lee et al.

(10) Patent No.: US 7,769,384 B2
(45) Date of Patent: *Aug. 3, 2010

(54) MOBILE BROADBAND WIRELESS ACCESS SYSTEM FOR TRANSFERRING SERVICE INFORMATION DURING HANDOVER

(75) Inventors: Chang Jae Lee, Chungcheongnam-do (KR); Young Suk Jin, Gyeonggi-do (KR); Gi Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/847,944

(22) Filed: Aug. 30, 2007

(65) Prior Publication Data

US 2007/0291699 A1    Dec. 20, 2007

Related U.S. Application Data

(63) Continuation of application No. 11/072,853, filed on Mar. 3, 2005.

(30) Foreign Application Priority Data

Mar. 5, 2004 (KR) .......................... 10-2004-15128

(51) Int. Cl.
*H04W 36/00* (2009.01)
(52) U.S. Cl. ...................................... 455/436; 370/331
(58) Field of Classification Search .................. 455/436
See application file for complete search history.

(56) References Cited

U.S. PATENT DOCUMENTS 5,371,738 A    12/1994    Moelard et al.

(Continued)

FOREIGN PATENT DOCUMENTS

EP    1284583    2/2003

(Continued)

OTHER PUBLICATIONS

IEEE 802.16 Task Group e. "Part 16: Air Interface for Fixed and Mobile Broadband Wireless Access Systems—Amendment for Physical and Medium Access Control Layers for Combined Fixed and Mobile Operation in Licensed Bands", IEEE 802.16e-03/076, IEEE 802.16 TGe Working Document [online], Dec. 9, 2003 [retrieved on Dec. 6, 2005]. Retrieved from the Internet: URL:http://www.ieee802.org/I6/tge/docs/8021r5e-03_07r5.zip figures og, C.1, C.2, D.5-D.10, sections 6.4.2.3.5, 6.4.2.3.6, 6.4.2.3.49-6.4.2.3.52, annex C.2.5-C.27.

(Continued)

*Primary Examiner*—Ajit Patel
(74) *Attorney, Agent, or Firm*—Lee, Hong Degerman, Kang & Waimey (57) ABSTRACT

The present invention is related to transmitting quality of service (QoS) information of a target base station for admitting service flows during a handover operation. The invention comprises providing a service to a mobile station from a serving base station and receiving at the serving base station a handover request from the mobile station. The serving base station then provides a handover notification to a target base station, wherein the handover notification comprises a QoS parameter associated with the service. The serving base station then receives from the target base station a handover notification response, wherein the handover notification response comprises service level prediction information that is determined in response to the QoS parameter associated with the service. Finally, the serving base station provides a handover response to the mobile station, the handover response comprising the service level prediction information.

13 Claims, 2 Drawing Sheets

U.S. PATENT DOCUMENTS

| | | | |
|---|---|---|---|
| 5,784,695 A * | 7/1998 | Upton et al. | 455/442 |
| 6,134,434 A | 10/2000 | Krishnamurthi et al. | |
| 6,374,112 B1 * | 4/2002 | Widegren et al. | 455/452.2 |
| 6,501,952 B1 | 12/2002 | Foster et al. | |
| 6,542,737 B1 * | 4/2003 | Kang et al. | 455/423 |
| 6,771,964 B1 * | 8/2004 | Einola et al. | 455/437 |
| 6,801,775 B1 | 10/2004 | Gibbons et al. | |
| 6,876,857 B1 * | 4/2005 | Nee et al. | 455/450 |
| 6,993,334 B2 | 1/2006 | Andrus et al. | |
| 7,065,360 B2 | 6/2006 | Yahagi | |
| 7,369,856 B2 | 5/2008 | Ovadia | |
| 7,430,418 B2 | 9/2008 | Kang et al. | |
| 7,532,596 B2 * | 5/2009 | Trossen et al. | 370/331 |

FOREIGN PATENT DOCUMENTS

| | | |
|---|---|---|
| EP | 1 324 628 A1 | 7/2003 |
| KR | 1020030061941 | 3/2005 |
| KR | 1020050024124 | 3/2005 |
| KR | 1020050066632 | 6/2005 |
| WO | WO 03/092316 A1 | 11/2003 |

OTHER PUBLICATIONS

Kim, S. et al. "Overall HO procedures for IEEE 802.16", IEEEC802.16e-03/47, IEEE 802.16 Broadband Wireless Access Working Group [online], Sep. 4, 2003 [retrieved on Dec. 6, 2005]. Retrieved from the Internet: <URL:http://www.ieee802.org/l6/tge/contrib/C80216e-03_47.pdf> especially figs. D. 6, D. 7.

* cited by examiner

MOBILE BROADBAND WIRELESS ACCESS SYSTEM FOR TRANSFERRING SERVICE INFORMATION DURING HANDOVER

CROSS-REFERENCE TO RELATED APPLICATIONS

This application is a continuation of U.S. Application Ser. No. 11/072,853, filed on Mar. 3, 2005, currently pending, which pursuant to 35 U.S.C. §119(a), claims the benefit of earlier filing date and right of priority to Korean Application No. P04-015128, filed on Mar. 5, 2004, the contents of which are hereby incorporated by reference herein in their entirety.

BACKGROUND OF THE INVENTION

1. Field of the Invention

The present invention relates to a mobile broadband wireless access system for transferring service information during a handover operation, and more particularly, to transmitting quality of service (QoS) information to a target base station for admitted service flows during the handover operation.

2. Description of the Related Art

Generally, a handover operation can be performed in a broadband wireless access system according to a request by a mobile subscriber station (MSS) or a base station (BS). In performing the handover operation from a current serving base station to one of a plurality of target base stations, the mobile subscriber station must provide quality of service (QoS) information for a service flow admitted in the current mobile subscriber station to the respective target base stations.

The QoS information provided to the target base stations includes a required bandwidth and a required service class name for the admitted service of the current mobile subscriber station. However, the target base stations are unable to sufficiently guarantee the QoS of a specific service with the QoS information only. In case a plurality of service flows are admitted in the mobile subscriber station, information indicating which one of the plurality of admitted service flows will be guaranteed is not provided.

For example, it is assumed that a mobile subscriber station receives both a real-time moving picture download service and a fixed speed service, such as a Voice Over Internet Protocol (VoIP), from a current serving base station. While the mobile subscriber station is receiving the services, if a situation needing handover occurs, the information about the required bandwidth and the service class name for one QoS guarantee is delivered to target base stations. However, specific handover quality information for maintaining a quality of service for each admitted service is not delivered to the target base stations. Hence, it is difficult to decide which one of the respective admitted service flows will be guaranteed for its QoS. Moreover, it is difficult for the target base station to predict the estimated QoS level for each of the services.

SUMMARY OF THE INVENTION

The present invention is directed to transmitting quality of service (QoS) information to a target base station for admitted service flows during a handover operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of receiving quality of service (QoS) information in a mobile station associated with a handover operation in a wireless communication system, the method comprising receiving at least one service from a serving base station, scanning at least one target base station to perform the handover operation, requesting a handover request with the serving base station, and receiving a handover response comprising service level prediction information from the serving base station, wherein the service level prediction information is determined by the at least one target base station in response to a QoS parameter associated with the at least one service received from the serving base station.

Preferably, the QoS parameter comprises at least one of latency information, reserved traffic rate, tolerable traffic rate and sustained traffic rate. The service level prediction information comprises at least one of (1) no service flow available for the mobile station, (2) all service flow available, (3) some service flow available, and (4) no service level prediction available. Moreover, the handover response further comprises a recommended target base station to where the mobile station should handover. Preferably, the mobile station determines the at least one target base station to handover to.

In one aspect of the present invention, the method further comprises requesting the at least one service from the serving base station, and receiving a service approval message from the serving base station. Preferably, the service approval message comprises at least one of a QoS parameter value for the at least one service requested and an indication as to the possibility of activating the at least one service requested.

In one embodiment of the invention, a method of providing quality of service (QoS) information associated with a handover operation in a wireless communication system, comprises providing at least one service to a mobile station from a serving base station, receiving at the serving base station a handover request from the mobile station, providing a handover notification to at least one target base station, wherein the handover notification comprises a QoS parameter associated with the at least one service, receiving from the at least one target base station a handover notification response, wherein the handover notification response comprises service level prediction information that is determined in response to the QoS parameter associated with the at least one service, and providing a handover response to the mobile station, the handover response comprising the service level prediction information.

Preferably, the QoS parameter comprises at least one of latency information, reserved traffic rate, tolerable traffic rate and sustained traffic rate. The service level prediction information comprises at least one of (1) no service flow available for a mobile station, (2) all service flow available, (3) some service flow available, and (4) no service level prediction available. Moreover, the handover response further comprises a recommended target base station to where the mobile station should handover. Preferably, the mobile station determines the at least one target base station to handover to.

In one aspect of the present invention, the method further comprises receiving a service request for at least one service from the mobile station, checking for the presence of radio resources available for the at least one service requested, allocating a radio resource to the mobile station having requested the at least one service if radio resources are available, and transmitting a service approval message to the mobile station.

Preferably, the service approval message comprises at least one of a QoS parameter value for the at least one service requested and an indication as to the possibility of activating the at least one service requested. Furthermore, the serving base station transmits information regarding at least one admitted service flow to the target base station allowing a QoS parameter value for the at least one admitted service flow to be periodically provided to the target base station.

In another aspect of the present invention, the method further comprises providing a handover confirmation to the at least one target base station, receiving at the serving base station a handover indication from the mobile station, and discontinuing communication between the serving base station and the mobile station.

In another embodiment, the present invention is embodied in a mobile station for receiving quality of service (QoS) information associated with a handover operation in a wireless communication system, the mobile station comprising means for receiving at least one service from a serving base station, means for scanning at least one target base station to perform the handover operation, and means for requesting a handover request with the serving base station, wherein the means for receiving the at least one service receives a handover response comprising service level prediction information from the serving base station, wherein the service level prediction information is determined by the at least one target base station in response to a QoS parameter associated with the at least one service received from the serving base station.

Preferably, the QoS parameter comprises at least one of latency information, reserved traffic rate, tolerable traffic rate and sustained traffic rate. The service level prediction information comprises at least one of (1) no service flow available for the mobile station, (2) all service flow available, (3) some service flow available, and (4) no service level prediction available. Moreover, the handover response further comprises a recommended target base station to where the mobile station should handover. Preferably, the mobile station determines the at least one target base station to handover to.

In one aspect of the present invention, the means for requesting the handover request requests the at least one service from the serving base station, and the means for receiving the at least one service receives a service approval message from the serving base station. Preferably, the service approval message comprises at least one of a QoS parameter value for the at least one service requested and an indication as to the possibility of activating the at least one service requested.

In one embodiment of the invention, a network for providing quality of service (QoS) information associated with a handover operation in a wireless communication system, comprises means for providing at least one service to a mobile station from a serving base station and means for receiving at the serving base station a handover request from the mobile station, wherein the means for providing the at least one service provides a handover notification to at least one target base station, wherein the handover notification comprises a QoS parameter associated with the at least one service, wherein the means for receiving the handover request receives from the at least one target base station a handover notification response, wherein the handover notification response comprising service level prediction information that is determined in response to the QoS parameter associated with the at least one service, wherein the means for providing at least one service provides a handover response to the mobile station, the handover response comprising the service level prediction information.

Preferably, the QoS parameter comprises at least one of latency information, reserved traffic rate, tolerable traffic rate and sustained traffic rate. The service level prediction information comprises at least one of (1) no service flow available for a mobile station, (2) all service flow available, (3) some service flow available, and (4) no service level prediction available. Moreover, the handover response further comprises a recommended target base station to where the mobile station should handover. Preferably, the mobile station determines the at least one target base station to handover to.

In one aspect of the present invention, the apparatus further comprises means for receiving a service request for at least one service from the mobile station, means for checking the presence of radio resources available for the at least one service requested and allocating a radio resource to the mobile station having requested the at least one service if radio resources are available, and means for transmitting a service approval message to the mobile station.

Preferably, the service approval message comprises at least one of a QoS parameter value for the at least one service requested and an indication as to the possibility of activating the at least one service requested. Furthermore, the serving base station transmits information regarding at least one admitted service flow to the target base station allowing a QoS parameter value for the at least one admitted service flow to be periodically provided to the target base station.

In another aspect of the present invention, the network further comprises means for providing a handover confirmation to the at least one target base station, means for receiving at the serving base station a handover indication from the mobile station, and means for discontinuing communication between the serving base station and the mobile station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

The present invention relates to transmitting quality of service (QoS) information to a target base station for admitted service flows during handover in a broadband wireless access system.

Figure 1:
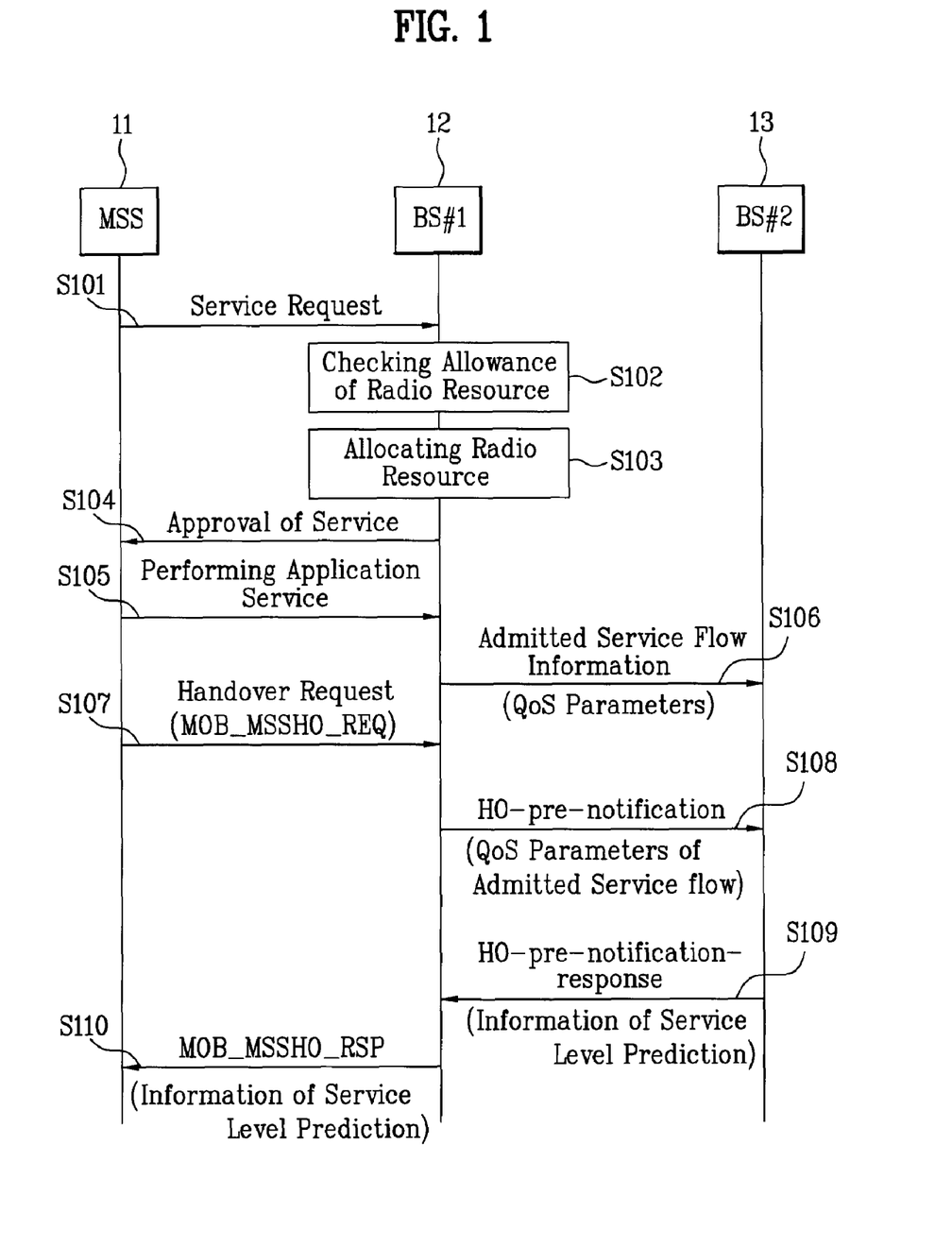
FIG. 1 is a flowchart for transferring quality of service information in accordance with one embodiment of the present invention.

Referring to FIG. 1, in one embodiment of the present invention, a mobile subscriber station (MSS) 11 transmits a service request message to a serving base station (BS #1) 12 to receive a specific application service (step S101). The service request message comprises information of a service flow to be activated and/or desired QoS parameters to receive the service.

The serving base station 12 having received the service request message checks for the presence of radio resources available for the service requested by the mobile subscriber station 11 (step S102). If radio resources are available, the serving base station 12 allocates a radio resource to the mobile subscriber station 11 having requested the service (step S103). Thereafter, information indicating whether the serving base station 12 is capable of performing the service flow requested by the mobile subscriber station 11 is transmitted via a service approval message to the mobile subscriber station 11 (step S104). The service approval message includes QoS parameter values for the service flow requested by the mobile subscriber station 11 and an indication as to the possibility of activating the requested service flow.

Once providing an application service to the mobile subscriber station 11 (step S105), the serving base station 12 transmits information regarding admitted service flows to target base stations (BS #2) 13 (step S106). In doing so, the QoS parameter values for the service flows can be periodically provided to the target base stations 13.

While the service flow is admitted in the above-explained manner, if the mobile subscriber station 11 transmits a handover request message (for example, MOB_MSSHO_REQ) (step S107), the serving base station 12 transmits a handover pre-notification message (HO-pre-notification) to the target base stations 13 (step S108). The handover pre-notification message (HO-pre-notification) may include required information for maintaining the respective admitted service flows. Preferably, the required information for maintaining the respective admitted service flow includes a service flow identifier (SFID), a service class name, QoS parameters corresponding to each service flow, and specific values corresponding to the QoS parameters, respectively. For example, the QoS parameters may be maximum latency, minimum reserved traffic rate, minimum tolerable traffic rate, maximum sustained traffic rate, etc.

Each of the target base stations 13 having received the handover pre-notification message (HO-pre-notification) decides whether it is capable of admitting a new mobile subscriber station 11. The decision is then transmitted to the serving base station 12 via a handover pre-notification response message (HO-pre-notification-response) (step S109). The handover pre-notification response message (HO-pre-notification-response) may include information indicating estimated service levels of the admitted service flows which can be provided to the current mobile subscriber station 11 from the target base stations 13.

Subsequently, the serving base station 12 having received the handover pre-notification response messages (HO-pre-notification-response) from the target stations 13, respectively transmits the information regarding the service levels that can be provided by the target base stations 13 to the mobile subscriber station 11 (step S110).

Figure 2:
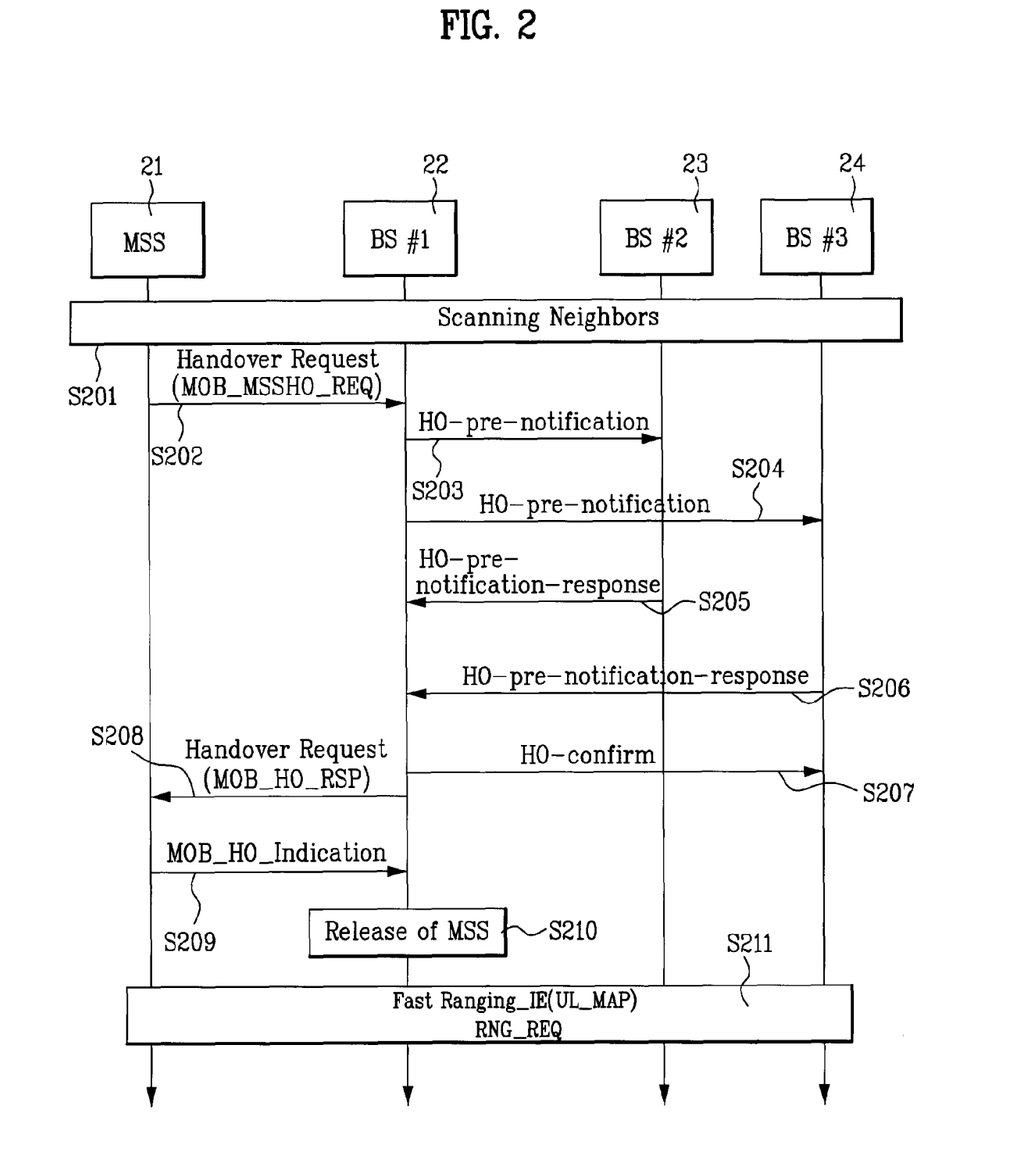
FIG. 2 is a flowchart for transferring quality of service information during handover in accordance with one embodiment of the present invention.

Referring to FIG. 2, in another embodiment of the present invention, there exists a plurality of target base stations from which a mobile subscriber station (MSS) 21 can choose to perform a handover operation with. Preferably, once the mobile subscriber station 21 is provided with an application service, as described in steps S101-S105 of FIG. 1, for example, the mobile subscriber station 21 scans neighbor base stations 22, 23, 24 (step S201). If the mobile subscribe station 21 decides to perform handover, the mobile subscriber station 21 transmits a handover request message (MOB_MSSHO_REQ) to a serving base station 22 (BS #1) (step S202).

The serving base station 22 then transmits a handover request pre-notification message (HO-pre-notification) to notify target base stations 23 and 24 (BS #2 and BS #3, respectively) that there exists the mobile subscriber station 21 requesting the handover (steps S203 and S204).

For example, Table 1 and Table 2 show configurations for handover request pre-notification messages (HO-pre-notification).

TABLE 1

| Field | Size | Contents |
| --- | --- | --- |
| Global Header | 152-bit | |
| For (j=0; J<Num Records; j++{ | | |
| MSS unique identifier | 48-bit | 48-bit unique identifier used by MSS (as provided by the MSS or by the I-am-host-of message) |
| Estimated Time to HO | 16-bit | In milliseconds, relative to the time stamp. A value of 0 indicates that the estimated time is known. |
| N_NSIE | | Number of Network Service Information Elements |
| For (k=0; k<N_NSIE; k++) | | |
| Field Size | 16-bit | Size of TLV encoded information field below |
| TLV encoded information | Variable | TLV information as allowed on a DSA_REQMAC message |
| } | | |
| } | | |
| Security field | TBD | A means to authenticate this message |
| CRC field | 32-bit | IEEE CRC-32 |

TABLE 2

| Field | Size | Contents |
| --- | --- | --- |
| Global Header | 152-bit | |
| For (j=0; J<Num Records; j++{ | | |
| MSS unique identifier | 48-bit | 48-bit unique identifier used by MSS (as provided by the MSS or by the I-am-host-of message) |

TABLE 2-continued

| Field | Size | Contents |
|---|---|---|
| Estimated Time to HO | 16-bit | In milliseconds, relative to the time stamp. A value of 0 indicates that the estimated time is known. |
| Required BW | 8-bit | Bandwidth which is required by MSS (to guarantee minimum packet data transmission) |
| For (i=0; i<Num_SFID_Records;i++){ SFID For (k=0; k<Num_QoS_Records;k++){ Required QoS Field Size | Variable | QoS parameter definition encodings that in combination define an Admitted QoS ParamterSet specific to the SFID |
| } } } | | |
| Security field | TBD | A means to authenticate this message |

In the present invention, parameters associated with a QoS corresponding to each admitted service flow and values corresponding to the parameters are transmitted using the handover request pre-notification message (HO-pre-notification) transmitted during handover from the serving base station 22 to the target base stations 23 and 44. In other words, the handover request pre-notification message (HO-pre-notification) includes the QoS parameters and the values corresponding to the parameters.

The QoS-associated information may be the same information as a service level prediction information that the serving base station 22 transfers to the mobile subscriber station 21 via a handover response message. Preferably, it is possible to divide the information to indicate "all service flows available," "several service flows available," "no service flows available," and the like.

One exemplary configuration of the handover pre-notification response message (HO-pre-notification-response) is shown in Table 3.

TABLE 3

| Field | Size | Contents |
|---|---|---|
| Global Header | 152-bit | |
| For (j=0; J<Num Records; j++{ | | |
| MSS unique identifier | 48-bit | 48-bit unique identifier used by MSS (as provided by the MSS or by the I-am-host-of message |
| Service level prediction | | Expected service level<br>0 = No service possible for this MSS.<br>1 = some service is available for one or several Service Flows authorized for the MSS.<br>2 = For each authorized Service Flow, a MAC connection can be established with QoS specified by the Authorized QoS parameter Set.<br>3 = No service level prediction available. |
| } | | |
| Security field | TBD | A means to authenticate this message |
| CRC field | 32-bit | IEEE CRC-32 |

Each of the target base stations 23 and 24 having received the handover request pre-notification message (HO-pre-notification) transmits a handover pre-notification response message (HO-pre-notification-response) to the serving base station 22 (steps S205 and S206). Preferably, the handover pre-notification response message (HO-pre-notification-response) includes QoS-associated information.

The QoS-associated information transmitted via the handover pre-notification response message (HO-pre-notification-response) preferably includes information regarding the presence of service estimation and information indicating estimated service levels of the admitted service flows which can be provided to the current mobile subscriber station 21 from each of the target base stations 23 and 24.

The serving base station 22 selects one base station appropriate for the handover execution from the target base stations 23 and 24. The serving base station 22 then transmits a handover confirmation message (HO-confirm) to the selected target base station. In this case, the selected base station is the target base station 24 (step S207). The serving base station 22 recommends the target base station 24 as the selected base station to the mobile subscriber station 21 via a handover response message (MOB_HO_RSP) (step S208).

One exemplary configuration of the handover response message (MOB_HO_RSP) is shown in Table 4.

TABLE 4

| Syntax | Size | Contents |
| --- | --- | --- |
| MOB_BSHO-RSP_Message_Format ( ) | | |
|   Management Message Type=53 | 8 bit | |
|   Estimated HO time | 8 bit | Target base stations shall be presented in an order such that the first presented is the one most recommended and the last presented is the least recommended.<br>N_Recommended can be derived from the known length of the message. |
|   For j(=0; j<N_Recommended; j++) | | |
|     Target BS-ID | 48 bit | |
|     Service level prediction | 8 bit | Expected service level<br>0 = No service possible for this MSS.<br>1 = some service is available for one or several Service Flows authorized for the MSS.<br>2 = For each authorized Service Flow, a MAC connection can be established with QoS specified by the Authorized QoS parameter Set.<br>3 = No service level prediction available. |
|   } | | |
| } | | |

The mobile subscriber station 21 may follow the recommendation received from the serving base station 22 and decide to execute the handover to the recommended target base station 24; however, the mobile subscriber station 21 may also choose not to follow the recommendation of the serving base station 22 and decide to execute the handover to a different target base station or not execute the handover at all. If handover is executed to the recommended target base station 24, the mobile subscriber station 21 transmits a handover indication message (MOB_HO_Indication) to the serving base station 22 (step S209). The serving base station 22 then recognizes the mobile subscriber station 21 executing the handover to the target base station 24 and releases a connection for the mobile subscriber station 21 (step S210). The mobile subscriber station 21 then performs a ranging process with the target base station 24 to set a new serving base station to the target base station 24 (step S211).

The embodiments of the present invention explain that the handover is executed according to a request made by the mobile subscriber station 21. However, transmission of QoS information for the respective admitted service flows is applicable to a case where the handover is executed upon a request made by a base station. Accordingly, the present invention can sustain the QoS for each of the admitted service flows in handover.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for receiving information in a mobile station associated with a handover operation in a wireless communication system, the method comprising:

transmitting, from the mobile station, a handover request message to a serving base station, wherein the handover request message causes the serving base station to communicate to a target base station an identification of the mobile station, first information used by the target base station for preparing the handover operation of the mobile station and second information related to maintaining service flows which are admitted through a negotiation procedure between the mobile station and the serving base station and which are currently provided by the serving base station to the mobile station, wherein the serving base station periodically transmits third information regarding at least one of the admitted service flows with quality of service (QoS) information for the at least one of the admitted service flows, wherein the second information comprises service flow identifiers (SFIDs) for each of the admitted service flows and QoS parameter sets for each of the admitted service flows; and receiving, at the mobile station, a handover response message from the serving base station in response to the handover request message, the handover response message comprising timing information for the handover operation of the mobile station and fourth information including a first indication that no service is possible for the mobile station, a second indication that some service is available for one or more of the service flows admitted to the mobile station, a third indication that a medium access control (MAC) connection can be established for each of the admitted service flows with the QoS information specified by each corresponding one of the QoS parameter sets or a fourth indication that no service level prediction is available.

2. The method according to claim 1, wherein the QoS parameter sets comprise a minimum traffic rate and a maximum traffic rate for each of the admitted service flows.

3. The method according to claim 1, further comprising:
determining in the mobile station whether or not to undergo the handover to the target base station.

4. The method according to claim 1, wherein the handover response message further comprises information for a recommended target base station with which the mobile station can perform the handover operation.

5. A method for providing information associated with a handover operation in a wireless communication system, the method comprising:

periodically transmitting, from a serving base station, first information regarding at least one admitted service flow to a target base station with quality of service (QoS) information for the at least one admitted service flow, wherein the at least one admitted service flow is admitted through a negotiation procedure between a mobile station and the serving base station and is currently provided by the serving base station to the mobile station;

receiving, in the serving base station, a handover request message from the mobile station;

transmitting, from the serving base station, a notification message to the target base station in response to receiving the handover request message, the notification message comprising an identification of the mobile station, second information used by the target base station for preparing the handover operation of the mobile station and third information related to maintaining the at least one admitted service flow, wherein the third information comprises service flow identifiers (SFIDs) for each of the at least one admitted service flow and QoS parameter sets for each of the at least one admitted service flow;

receiving, in the serving base station, a response message from the target base station in response to the notification message, the response message comprising fourth information including a first indication that no service is possible for the mobile station, a second indication that some service is available for one or several of the at least one admitted service flow, a third indication that a medium access control (MAC) connection can be established for each of the at least one admitted service flow with the QoS information specified by each corresponding one of the QoS parameter sets or a fourth indication that no service level prediction is available; and transmitting a handover response message and the fourth information to the mobile station, wherein the handover response message comprises timing information for the handover operation of the mobile station.

6. The method according to claim 5, wherein the QoS parameter sets comprise a minimum traffic rate and a maximum sustained traffic rate for each of the at least one admitted service flow.

7. The method according to claim 5, wherein the fourth information further comprises information for a recommended target base station with which the mobile station can perform the handover operation.

8. An apparatus for facilitating handover operation in a wireless communication system, the apparatus comprising:

a receiver configured to receive a handover request message from a mobile station;

a transmitter configured to transmit to a target base station, a notification message in response to the handover request message, the notification message comprising an identification of the mobile station, first information used by the target base station for preparing the handover operation of the mobile station and second information, wherein the second information is related to maintaining admitted service flows which are admitted through a negotiation procedure between the mobile station and a serving base station and which are currently provided by the serving base station to the mobile station, wherein the transmitter periodically transmits third information regarding at least one of the admitted service flows with quality of service (QoS) information for the at least one of the admitted service flows, wherein the second information comprises service flow identifiers (SFIDs) for each of the admitted service flows and QoS parameter sets for each of the admitted service flows, wherein the receiver is further configured to receive a response message from the target base station in response to the notification message, the response message comprising fourth information including a first indication that no service is possible for the mobile station, a second indication that some service is available for one or more of the admitted service flows, a third indication that a medium access control (MAC) connection can be established for each of the admitted service flows with the QoS information specified by each corresponding one of the QoS parameter sets or a fourth indication that no service level prediction is available, wherein the transmitter is further configured to transmit a handover response message and the fourth information to the mobile station, and wherein the handover response message comprises timing information for the handover operation of the mobile station.

9. The apparatus according to claim 8, wherein the QoS parameter sets comprise a minimum traffic rate and a maximum traffic rate for each of the admitted service flows.

10. The method of claim 1, wherein the handover response message comprises a time interval within which the mobile station performs the handover operation to the target base station.

11. The method of claim 1, wherein the negotiation procedure comprises:

transmitting a service request message from the mobile station to the serving base station, the service request message comprising information related to a service flow to be activated; and receiving a service response message in the mobile station from the serving base station indicating whether the service flow is activated, the service response message comprising a QoS parameter set associated with the service flow.

12. The method of claim 5, wherein the handover response message comprises a time interval within which the mobile station performs the handover operation to the target base station.

13. The apparatus of claim 8, wherein the handover response message comprises a time interval within which the mobile station performs the handover operation to the target base station.

* * * * *